US009955253B1

(12) United States Patent
Chavez

(10) Patent No.: US 9,955,253 B1
(45) Date of Patent: Apr. 24, 2018

(54) SYSTEMS AND METHODS FOR DIRECTIONAL LOUDSPEAKER CONTROL WITH FACIAL DETECTION

(71) Applicant: Harman International Industries, Incorporated, Stamford, CT (US)

(72) Inventor: Paul Michael Chavez, Chatsworth, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/297,044

(22) Filed: Oct. 18, 2016

(51) Int. Cl.
| H04R 5/04 | (2006.01) |
| H04R 1/40 | (2006.01) |
| H04R 3/12 | (2006.01) |
| H04R 27/00 | (2006.01) |
| G06K 9/00 | (2006.01) |
| H04N 7/18 | (2006.01) |

(52) U.S. Cl.
CPC ......... *H04R 1/403* (2013.01); *G06K 9/00228* (2013.01); *G06K 9/00778* (2013.01); *H04N 7/183* (2013.01); *H04R 3/12* (2013.01); *H04R 27/00* (2013.01); *H04R 2430/01* (2013.01)

(58) Field of Classification Search
CPC ...... H04R 5/04; H04R 2420/07; H04W 4/008
USPC ............ 381/85, 80, 9, 61, 36, 160, 302, 309
See application file for complete search history.

(56) References Cited

U.S. PATENT DOCUMENTS

| 2005/0259831 A1* | 11/2005 | Hutt ....................... H04R 1/345 381/86 |
| 2013/0142337 A1* | 6/2013 | Troughton .......... F41H 13/0081 381/2 |
| 2016/0295340 A1* | 10/2016 | Baker .................... H04R 1/403 |

FOREIGN PATENT DOCUMENTS

| EP | 2996345 A1 | 3/2016 |
| JP | 2009218950 A | * 9/2009 |
| JP | 2013157843 A | 8/2013 |
| WO | 2016048381 A1 | 3/2016 |

OTHER PUBLICATIONS

European Patent Office, Extended European Search Report Issued in Application No. 17193281.7, dated Feb. 7, 2018, 8 pages.

* cited by examiner

*Primary Examiner* — Melur Ramakrishnaiah
(74) *Attorney, Agent, or Firm* — McCoy Russell LLP

(57) ABSTRACT

Systems and methods are proposed for adjusting the coverage pattern of a directional loudspeaker array. The methods may comprise adjusting a coverage pattern of a loudspeaker array based on a distribution of audience members. The audience distribution may be determined by imaging a venue with a camera, performing facial detection on the resultant image, and processing the facial detection results to obtain the distribution.

18 Claims, 8 Drawing Sheets

SYSTEMS AND METHODS FOR DIRECTIONAL LOUDSPEAKER CONTROL WITH FACIAL DETECTION

FIELD

The disclosure relates to adjustment of a coverage pattern for a loudspeaker array.

BACKGROUND

Steerable loudspeaker arrays, such as line arrays, provide a conventional method for adjusting the coverage pattern provided by a sound system. The coverage patterns may be adjusting using beam steering techniques to provide a coverage pattern which is adapted to the particular architecture of a venue, thereby resulting in a greater proportion of direct sound received by audience members and reducing unwanted reverberation effects or destructive interference. Steerable sound systems may improve audio quality and listening experience for audience members in a given venue.

However, steerable loudspeaker arrays suffer from the drawback that programming the array with the desired coverage pattern must typically be performed in advance by generating a three-dimensional model of the venue and obtaining DPS parameters by running simulations with the model, for example. This may be time-consuming and costly, as well as requiring specialized knowledge and equipment. In addition, the coverage pattern generated by this method is static, and therefore unable to adapt to changes in audience size, shape, or distribution. This may result in significant wastage of power when high-intensity sound is directed toward regions of a venue with no audience members, for example. This may also result in sub-optimal sound quality for those audience members who are in the audience, since the loudspeaker array may not be optimized for their particular position or distribution. There is thus a need for an adaptive loudspeaker steering system which can alter the coverage pattern of the loudspeaker array according to a location, density, distribution, shape, or number of audience members.

SUMMARY

The above objects may be achieved by, for example, a method, comprising adjusting a coverage pattern of a loudspeaker array based on a distribution of audience members. This method may utilize a digital audio steering system (DASS) and enable the DASS to direct sound energy where it is needed—for example, regions of a venue with audience members—and to direct reduced sound energy where it is not needed—for example, regions of a venue with fewer audience members. This adjustment may be performed before, during, and/or after reproduction of sound with the loudspeaker array, or performed periodically or continually in real-time during sound reproduction, allowing for adaptive automatic control of the coverage pattern, even if the audience distribution changes throughout a performance, for example. Adjusting a coverage pattern which reduces sending sound energy to regions with fewer audience members may allow for a reduction in the energy consumption of the system, as well as reducing unwanted interference effects which may result in reverberation affecting sound quality. Therefore, the sound quality and listener experience is improved.

In another example, the present disclosure may provide for a system, comprising a loudspeaker array including a plurality of loudspeakers directed toward a venue, a camera directed toward the venue, a processor including computer-readable instructions stored in non-transitory memory for: obtaining an image of the venue with the camera, processing the image to obtain facial detection data, and selecting a coverage pattern for the loudspeaker array based on the facial detection data.

In still other examples, the above objects may be achieved by a method, comprising receiving an image of a venue from a camera, performing facial detection on the image to obtain facial detection data, analyzing the facial detection data to obtain an audience member distribution, adjusting a coverage pattern of a loudspeaker array based on the audience member distribution to direct a first, greater sound level to a first region, and a second, lower sound level to a second region, and reproducing sound via the loudspeaker array.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The disclosure may be better understood from reading the following description of non-limiting embodiments, with reference to the attached drawings, wherein below.

DETAILED DESCRIPTION

As noted above, systems and methods for the automatic adjustment of said coverage pattern based on a distribution of audience members in a venue detected by facial detection are provided.

Figure 1:
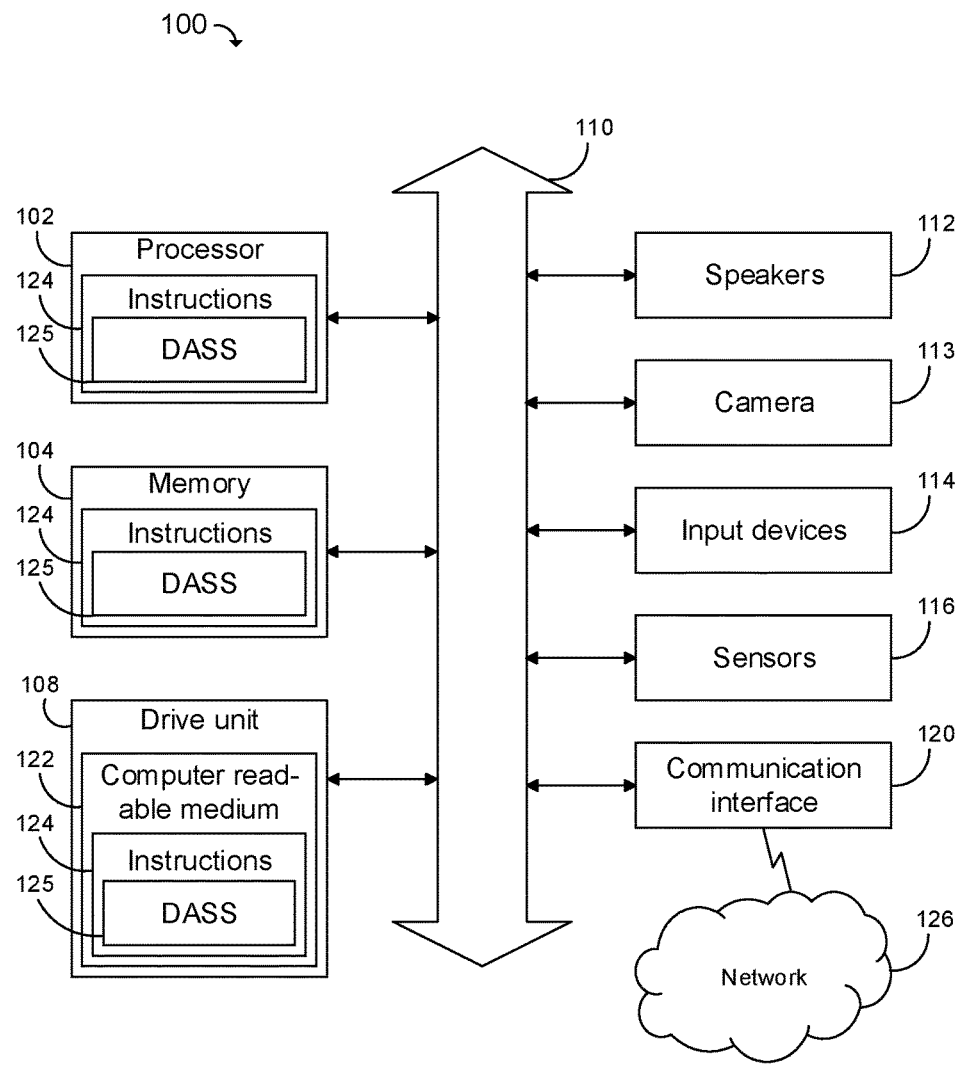
FIG. 1 shows an example electronic device which may embody aspects of the DASS.

FIG. 1 is a block diagram of an example electronic device 100 that may include one or more aspects of an example DASS. The electronic device 100 may include a set of instructions that can be executed to cause the electronic device 100 to perform one or more of the methods or computer based functions disclosed, such as imaging a venue, performing facial detection on the image, determining a coverage pattern based on the facial detection, adjusting the phase and amplitude of speakers in a speaker array to achieve the desired coverage pattern, and reproducing sound via the loudspeaker array. The electronic device 100 may operate as a standalone device or may be connected, such as using a network, to other computer systems or peripheral devices.

In the example of a networked deployment, the electronic device 100 may operate in the capacity of a server or as a client user computer in a server-client user network environment, as a peer computer system in a peer-to-peer (or distributed) network environment, or in various other ways. The electronic device 100 can also be implemented as, or incorporated into, various electronic devices, such as desktop and laptop computers, hand-held devices such as smartphones and tablet computers, portable media devices such as recording, playing, and gaming devices, household appliances, office equipment, set-top boxes, automotive electronics such as head units and navigation systems, or other machine capable of executing a set of instructions (sequential or otherwise) that result in actions to be taken by that machine. The electronic device 100 may be implemented using electronic devices that provide voice, audio, video and/or data communication. While a single electronic device 100 is illustrated, the term "device" may include a collection of devices or sub-devices that individually or jointly execute a set, or multiple sets, of instructions to perform one or more electronic functions of the DASS, elaborated below in greater detail.

The electronic device 100 may include a processor 102, such as a central processing unit (CPU), a graphics processing unit (GPU), or both. The processor 102 may be a component in a variety of systems. For example, the processor 102 may be part of a head unit in a vehicle. Also, the processor 102 may include one or more general processors, digital signal processors, application specific integrated circuits, field programmable gate arrays, servers, networks, digital circuits, analog circuits, combinations thereof, or other now known or later developed devices for analyzing and processing data. The processor 102 may implement a software program, such as code generated manually or programmed.

The electronic device 100 may include memory, such as a memory 104 that can communicate via a bus 110. The memory 104 may be or include a main memory, a static memory, or a dynamic memory. The memory 104 may include a non-transitory memory device. The memory 104 may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media and the like. Also, the memory may include a non-transitory tangible medium upon which software is stored. The software may be electronically stored as an image or in another format (such as through an optical scan), then compiled, or interpreted or otherwise processed.

In one example, the memory 104 includes a cache or random access memory for the processor 102. In alternative examples, the memory 104 may be separate from the processor 102, such as a cache memory of a processor, the system memory, or other memory. The memory 104 may be or include an external storage device or database for storing data. Examples include a hard drive, compact disc ("CD"), digital video disc ("DVD"), memory card, memory stick, floppy disc, universal serial bus ("USB") memory device, or other device operative to store data. For example, the electronic device 100 may also include a disk or optical drive unit 108. The drive unit 108 may include a computer-readable medium 122 in which one or more sets of software or instructions, such as the instructions 124, can be embedded. Not depicted in FIG. 1, the processor 102 and the memory 104 may also include a computer-readable medium with instructions or software.

The memory 104 is operable to store instructions executable by the processor 102. The functions, acts or tasks illustrated in the figures or described may be performed by the programmed processor 102 executing the instructions stored in the memory 104. The functions, acts or tasks may be independent of the particular type of instructions set, storage media, processor or processing strategy and may be performed by software, hardware, integrated circuits, firmware, microcode and the like, operating alone or in combination. Likewise, processing strategies may include multi-processing, multitasking, parallel processing and the like.

The instructions 124 may embody one or more of the methods or logic described herein, including aspects of the electronic device 100 and/or an example digital audio steering system (such as DASS 125). The instructions 124 may reside completely, or partially, within the memory 104 or within the processor 102 during execution by the electronic device 100. For example, software aspects of DASS 125 may include examples of the audio signal processor, which may reside completely, or partially, within the memory 104 or within the processor 102 during execution by the electronic device 100.

With respect to the audio signal processor, hardware or software implementations may include analog and/or digital signal processing components and/or instructions (and analog-to-digital and/or digital-to-analog converters). The analog signal processing components and/or instructions may include linear electronic circuits such as passive filters, active filters, additive mixers, integrators and delay lines. Analog processing components and/or instructions may also include non-linear circuits such as compandors, multiplicators (frequency mixers and voltage-controlled amplifiers), voltage-controlled filters, voltage-controlled oscillators and phase-locked loops. The digital or discrete signal processing components and/or instructions may include sample and hold circuits, analog time-division multiplexers, analog delay lines and analog feedback shift registers, for example. In other implementations, the digital signal processing components and/or instructions may include ASICs, field-programmable gate arrays or specialized digital signal processors (DSP chips). Either way, such digital signal processing may enhance an audio signal via arithmetical operations that include fixed-point and floating-point, real-valued and complex-valued, multiplication, and/or addition. Other operations may be supported by circular buffers and/or look-up tables. Such operations may include Fast Fourier transform (FFT), finite impulse response (FIR) filter, Infinite impulse response (IIR) filter, and/or adaptive filters such as the Wiener and Kalman filters.

Further, the electronic device 100 may include a computer-readable medium that includes the instructions 124 or receives and executes the instructions 124 responsive to a propagated signal so that a device connected to a network 126 can communicate voice, video, audio, images or other data over the network 126. The instructions 124 may be transmitted or received over the network 126 via a communication port or interface 120, or using a bus 110. The communication port or interface 120 may be a part of the processor 102 or may be a separate component. The communication port or interface 120 may be created in software or may be a physical connection in hardware. The communication port or interface 120 may be configured to connect with the network 126, external media, one or more speakers 112, one or more cameras 113, one or more sensors 116, or other components in the electronic device 100, or combinations thereof. The connection with the network 126 may be a physical connection, such as a wired Ethernet connection or may be established wirelessly. The additional connections with other components of the electronic device 100 may be physical connections or may be established wirelessly. The network 126 may alternatively be directly connected to the bus 110.

The network 126 may include wired networks, wireless networks, Ethernet AVB networks, a CAN bus, a MOST bus, or combinations thereof. The wireless network may be or include a cellular telephone network, an 802.11, 802.16, 802.20, 802.1Q or WiMax network. The wireless network may also include a wireless LAN, implemented via WI-FI or BLUETOOTH technologies. Further, the network 126 may be or include a public network, such as the Internet, a private network, such as an intranet, or combinations thereof, and may utilize a variety of networking protocols now available or later developed including TCP/IP based networking protocols. One or more components of the electronic device 100 may communicate with each other by or through the network 126.

The electronic device 100 may also include one or more speakers 112, such as loudspeakers installed in a vehicle, living space, or venue. The one or more speakers may be part of a stereo system or a surround sound system that include one or more audio channels. In particular, speakers 112 may comprise an array of speakers. For example, speakers 112 may include a plurality of speakers arranged linearly into a line array. Speakers 112 may comprise multiple line arrays, or arrays of alternate geometry. Speakers 112 may comprise horn driver loudspeakers, electromechanical loudspeakers such as magnet-driver woofers and/or piezoelectric speakers.

In order to carry out the functions of the DASS, the processor or other components may manipulate or process sound signals sent to speakers 112. In particular, when speakers 112 comprise a line array or other type of array, sound signals may be sent to each speaker in the array. These signals may be separately processed, or one or more signals may be jointly processed. The processing may be performed by analog or digital components and/or instructions, as described above. In particular, to execute the functions of the DASS, the electronic device 100 may include instructions for adjusting a phase, amplitude, and/or delay of each sound signal delivered to the speakers in the array. The phase, amplitude and/or delay may be controlled in such a manner as to produce a desired coverage pattern, as described in greater detail below. The adjustment of the phase, amplitude, and/or delay of speakers in the array is discussed below with reference to FIG. 2.

The electronic device 100 may also include one or more cameras 113 configured to capture and generate images. The one or more cameras 113 may be digital cameras or charge-capture devices (CCDs) configured to generate digital images of an environment of electronic device 100. The one or more cameras may comprise optical cameras responsive to visual light, infrared cameras, ultraviolet cameras, or other cameras appropriate to the application.

The electronic device 100 may also include one or more input devices 114 configured to allow a user to interact with the components of the electronic device. The one or more input devices 114 may include a keypad, a keyboard, and/or a cursor control device, such as a mouse, or a joystick. Also, the one or more input devices 114 may include a remote control, touchscreen display, or other device operative to interact with the electronic device 100, such as a device operative to act as an interface between the electronic device and one or more users and/or other electronic devices.

The electronic device 100 may also include one or more sensors 116. The one or more sensors 116 may include one or more proximity sensors, motion sensors, or cameras (such as found in a mobile device). Functionally, the one or more sensors 116 may include one or more sensors that detect or measure, motion, temperature, magnetic fields, gravity, humidity, moisture, vibration, pressure, electrical fields, sound, or other physical aspects associate with a potential user or an environment surrounding the user.

Figure 2:
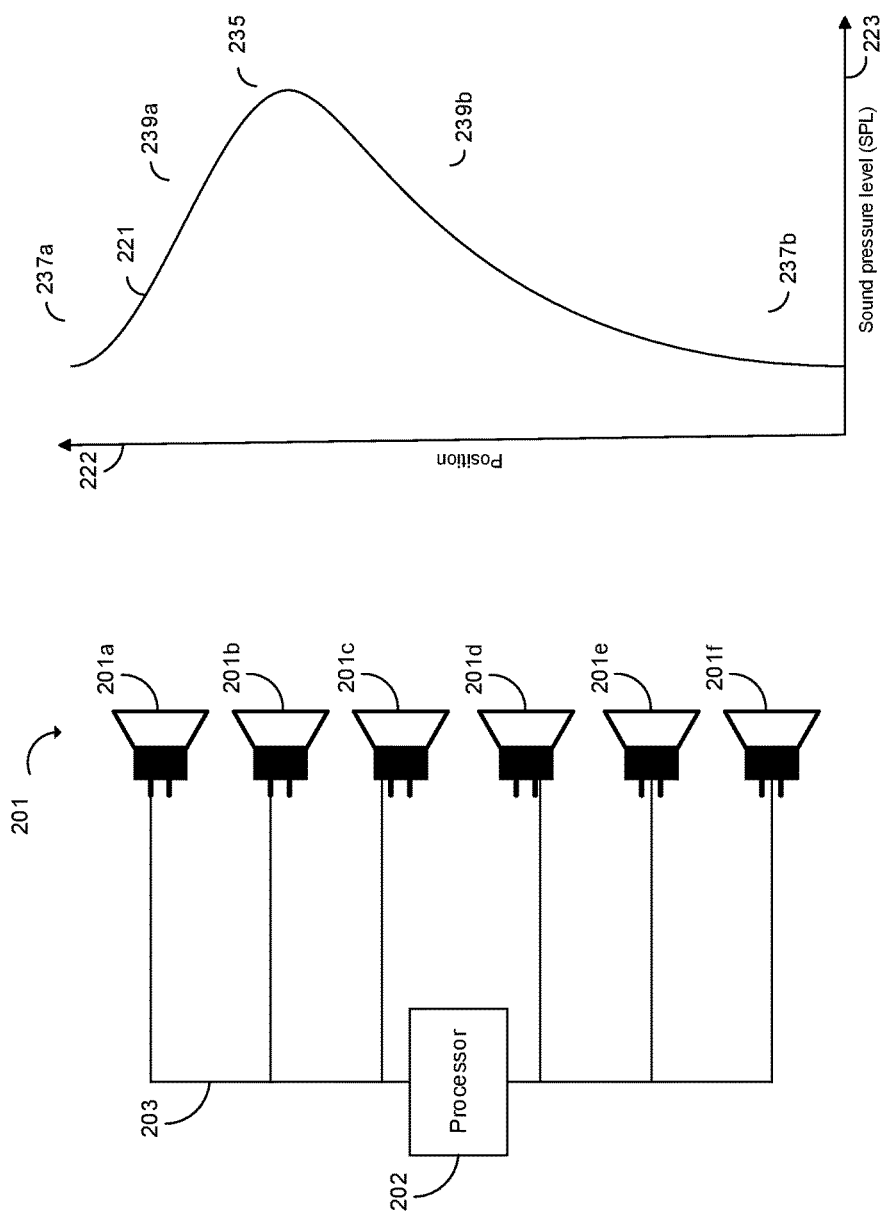
FIG. 2 shows an example embodiment of the DASS as a line array and coverage pattern thereof.

Turning now to FIG. 2, an example embodiment of the DASS is illustrated. In this embodiment, the DASS may include an array 201 of speakers 201a-201f communicatively coupled to processor 202. The processor may comprise processor 102 in electronic device 100, and the speakers 201a-201f in the array of speakers 201 may comprise speakers 112, for example. The speakers 201a-201f may be coupled to processor 202 as shown. As shown in FIG. 2, speakers 201a-201f are coupled to processor 202 by wired connections 203. In other examples, speakers 201a-201f may communicate with processor 202 by wireless connection, Internet, local area network, Bluetooth, infrared, or others.

Speaker array 201 may be configured by the processor 202 to output sound with a desired coverage pattern. The right side of FIG. 2 shows and example coverage pattern 221 which may be generated by speaker array 201. Coverage pattern 221 is shown in graphical form, wherein the vertical axis represents spatial distance or position 222 and the horizontal axis represents sound pressure level (SPL) 223. The spatial position 222 may be measured along an axis on which sound pressure level is to be controlled; for example, when speaker array 201 comprises a vertically oriented line array, position 222 may be representative of a vertical distance (height) as measured at some predetermined distance away from the speaker array. Similarly, sound pressure level 223 may also be measured at the predetermined distance away from the speaker array. As may be seen in plot 221, the coverage pattern of the speaker array may vary with position. In this example, the coverage pattern includes a peak or lobe where sound intensity is the greatest, indicated at 235. It will be appreciated that many different coverage patterns are possible with a given speaker array. For example, the coverage pattern may include multiple peaks which may be of the same or different intensity; the coverage pattern may include no peaks; the coverage pattern may be linearly increasing, decreasing, or constant; the coverage pattern may follow a Gaussian, polynomial, power law, or exponential curve; the coverage pattern may be defined piecewise, for example, including coverage patterns defined by piecewise linear or cubic spline interpolation.

A desired coverage pattern may be obtained from speaker array 201 by appropriate means. The coverage pattern may be altered by altering the phase, delay, and/or amplitude of the sound signals reproduced by each loudspeaker 201a-201f in the loudspeaker array 201. By appropriately controlling the phase of each loudspeaker, the coverage pattern may be altered in a desired manner. In one example, a desired coverage pattern may comprise a substantially uniform or "constant beamwidth" coverage pattern. In order to achieve this coverage pattern, a delay and/or amplitude of each speaker 201a-201f in the speaker array 201 may be controlled. In this example, central speakers 201c and 201d may be selected to have substantially zero delay. Proximate speakers 201b and 201e, which are immediately adjacent to and outside of central speakers 201c and 201d, may then be selected to have a first delay. Speakers 201a and 201f, immediately adjacent to and outside of speakers 201c and 201d, may then be selected to have a second delay, greater than the first delay. In other embodiments with a greater number of loudspeakers in the array, this pattern may continue in a similar fashion, with delays progressively increasing in loudspeakers located further from the center of the array. The delays may be symmetric or asymmetric about the central loudspeaker(s).

The length of the first and second delays (and further delays, in embodiments with more loudspeakers) may be based on one or more properties of the speaker array 201, electronic device 100, and/or a frequency of reproduced sound. For example, when the goal is to improve speaker response at a distance $r_o$ from the central speaker(s) by generating constructive interference, a first delay $d_1$ may be given by $$d_1 = \frac{1}{c_s}\left[\sqrt{r_0^2 + s_1^2} - r_0\right]$$

where $s_1$ denotes a distance between the central speaker(s) and the neighboring speakers, and where $c_s$ is the speed of sound. Thus, the sound generated by a second speaker or set of speakers may be delayed appropriately such that the sound from the first, central speaker(s), and the second, neighboring speakers may constructively interfere in a desired location or locations. A second delay, and further delays if needed, may be computed similarly, or by another appropriate method. In other examples, the delay or phase of speakers in the array may be controlled to produce destructive interference at desired locations, and/or mixed constructive and destructive interference at desired locations.

Controlling the coverage pattern produced by the speaker array 201 may also include controlling an amplitude of sound produced by each speaker 201a-201f in the array. Continuing with the example of the constant beamwidth coverage pattern, this may include selecting a first amplitude for central speakers 201c and 201d; a second amplitude, lower than the first amplitude, for speakers 201b and 201e; and a third amplitude, lower than the second amplitude, for speakers 201a and 201f. This may reduce the occurrence of off-axis interference effects and the presence of "side lobes," thereby increasing the uniformity of the coverage pattern and corresponding sound quality.

In another example, the phases and amplitudes of each speaker in the speaker array may be controlled to produce the coverage pattern 221 shown on the right side of FIG. 2. Methods similar to those discussed above may be employed to produce coverage pattern 221, which may include constructive interference at location 235 in the coverage pattern, thereby producing a peak. The coverage pattern may also include regions of substantial destructive interference, such as 237a and 237b, where the amplitude of the SPL signal is low or substantially zero. The coverage pattern may also include regions of mixed constructive and destructive interference which may result in intermediate SPL values, such as those shown at 239a and 239b. To produce this coverage pattern, speaker 201b may be selected to have substantially zero delay; speakers 201a and 201c may have a first delay; speaker 201d may have a second delay longer than the first delay; and speakers 201e and 201f may have progressively longer third and fourth delays, for example. Other appropriate beam steering techniques may be employed to achieve the desired coverage pattern.

The delay, phase, and/or amplitude adjustments assigned to the speakers in the speaker array 201 may be produced according to appropriate techniques, which may include digital or analog instructions and/or components. In one example, the adjustments may be generated by a cascaded LC (inductor-capacitor) ladder network. In other examples, the phase, delay, and/or amplitude adjustments may be performed digitally by the processor or other components, according to computer-readable instructions stored in non-transitory memory.

In this manner, a desired coverage pattern may be obtained by assigning phase and amplitude values to each speaker in the array, thereby creating an array profile. However, at differing frequencies, the wavelengths of sound emitted by the speakers are different, thus a different coverage pattern may be produced by a given array profile at different frequencies. For this reason, in order to obtain a stable coverage pattern across different frequencies, different array profiles may be generated at a plurality of different frequencies. Additionally or alternatively, the array profile may vary smoothly as the frequency changes. It is also conceivable that different coverage patterns may be desired in different frequency bands, in which case different array profiles may be selected accordingly.

Figure 3:
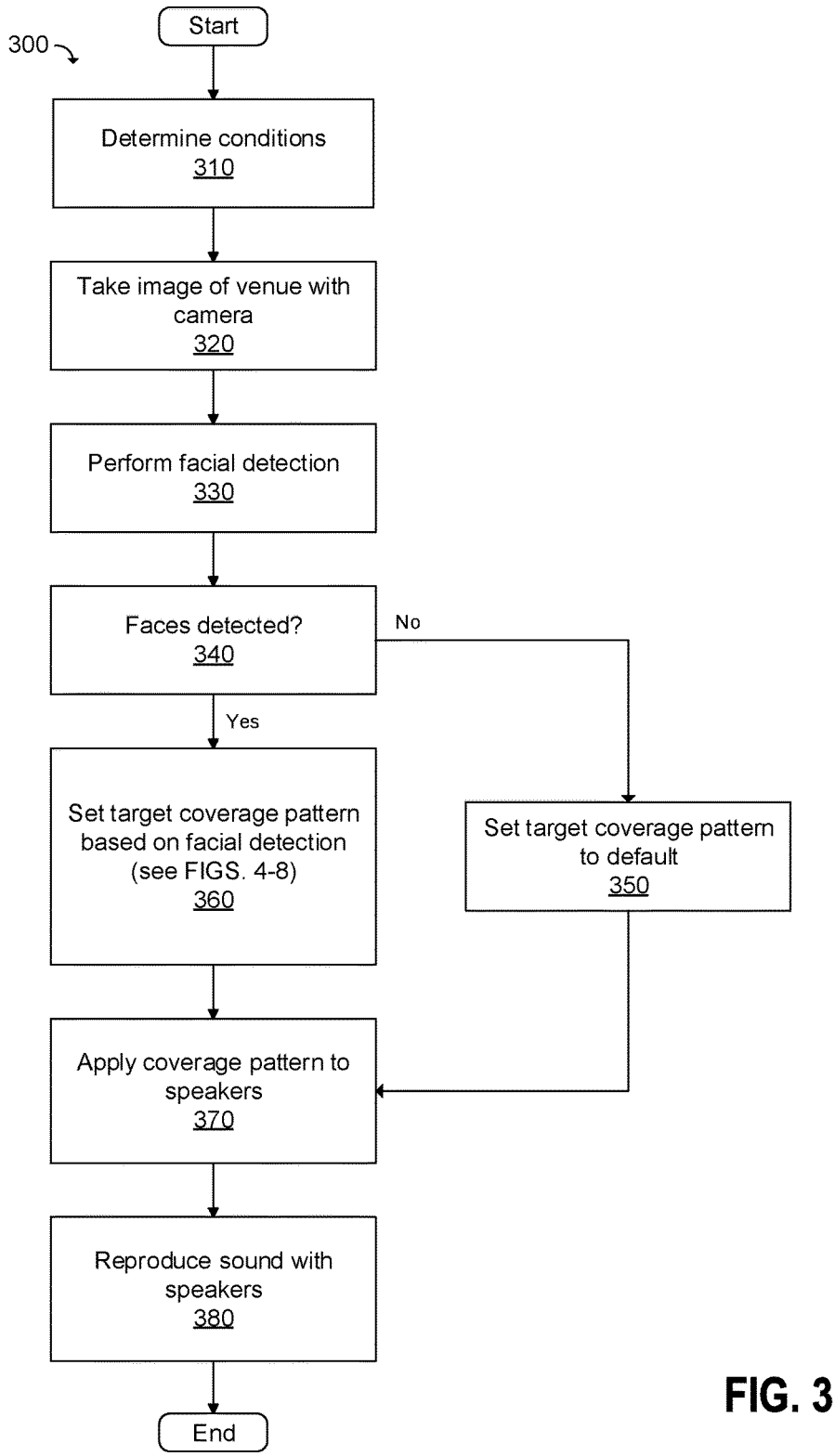
FIG. 3 shows a method for selecting a coverage pattern based on facial detection.

Turning now to FIG. 3, an example high-level routine 300 is shown for adjusting speaker array coverage patterns based on facial detection data. Routine 300 may be performed by DAS system 100, in one example.

At 310, operational conditions of the DASS may be determined. For example, it may be determined whether a request has been made to update the coverage pattern of the system. A request may be received via input device 114 from an operator, or the request may be automatically generated after a predetermined time has elapsed since the most recent occasion when the coverage pattern was adjusted. However, in some examples, routine 300 may proceed automatically, without receiving a request to update the coverage pattern. The operational condition of components of electronic device 100 may also be determined to ensure there are no errors or faults. If an error or fault is detected or a request is not made, routine 300 may optionally abort and/or alert a user that an error has occurred. Otherwise, processing proceeds to 320.

At 320, an image of a venue is taken with the camera. This could include taking an image of an appropriate venue with camera 113. The venue is understood to be a space in which audience members are expected to be, and into which sound from the speakers is to be directed. Thus, the camera and the speakers may be directed at the same venue, and the camera may thereby be directed at an area into which sound will be aimed with the speaker array according to the teachings of the present disclosure. The camera may be mounted near the speaker array, such as integrally mounted in a housing containing the speaker array. Alternatively, the camera may be located at a distance from the speaker array, but nevertheless be trained on the same venue. In one example, the speaker array may be located at a front end of a venue, while the camera is located above, giving a "bird's eye" view of the audience. In yet another example, two or more cameras may be mounted in different locations, and the images from each of the two or more cameras may be used in subsequent processing. After the image of the venue is acquired, processing proceeds to step 330.

At 330, facial detection is performed on the image. This may include, for example, passing the image from the camera to the processor, and performing the facial detection with the processor. Facial detection may be performed to generate facial detection data, to be used in subsequent processing. The facial detection in 330 may be performed by an appropriate method, such as template matching; vector-based approaches such as the Eigenface method; neural network techniques; principal component analysis; linear discriminant analysis; hidden Markov models; or another appropriate method. Additionally or alternatively, commercially available proprietary facial detection or detection software programs may be employed to generate facial detection data in step 330.

Facial detection may include identifying one or more faces in the image. The resultant facial detection data may include the number of faces in the image, the location of each face in the image, and/or the size of each face in the image. In some examples, facial detection may associate a confidence value with each face. In other examples, facial recognition algorithms or other appropriate methods may be employed to generate the facial detection data. After the facial detection is performed and the facial detection data is generated, processing advances to 340.

At 340, the results of the facial detection performed at 330 are evaluated. If no faces are identified in the image, routine 300 proceeds to set a default target coverage pattern in 350. If one or more faces are identified, routine 300 proceeds to set a target coverage pattern based on the results of the facial detection at 360. Alternatively, routine 300 may proceed to 350, thereby using a default coverage pattern, if too few faces are detected. For example, routine 300 may proceed to 350 if less than a threshold number of faces are detected, and proceed to 360 if a number of faces greater than or equal to the threshold is detected. In determining whether faces are detected, or whether a threshold number of faces are detected, faces which are located too far from the speaker array, or at a periphery of the venue, may be disregarded.

At 350, a default target coverage pattern is selected. The default target coverage pattern may be a desired coverage pattern, including linearly increasing, decreasing, constant, Gaussian, polynomial, power law, exponential curve, or piecewise defined curve. In some examples, the target default coverage pattern may be based on a three-dimensional model of the venue and respective DSP parameters. In other examples, the target default coverage pattern may not be based on a three-dimensional model of the venue and/or respective DSP parameters. Alternatively, setting a default target coverage pattern at 350 may include disabling the speakers until the facial detection processing detects one or more (or a threshold number of) faces, in order to conserve power. After the default target coverage pattern is selected, processing proceeds to 370.

At 360, a target coverage pattern is selected based on the results of the facial detection. This may include performing a cluster analysis on the facial detection results, and selecting a coverage pattern based on the size and location of the clusters. In another example, setting the target coverage pattern may include dividing the facial detection image into regions, computing the density of each region, and selecting a coverage pattern based on the density. Selecting the coverage pattern based on the facial detection may be performed without the use of a three-dimensional venue model or corresponding DSP parameters. Example methods for selecting a target coverage pattern based on the facial detection data are elaborated below with reference to FIGS. 4-8. After routine 300 has selected a target coverage pattern, processing proceeds to 370.

At 370, the target coverage pattern is applied to the speakers in the speaker array. This may include adjusting a phase and an amplitude for each speaker 201a-201f in the array of speakers 201 in order to generate the desired coverage pattern, as described above with reference to FIG. 2. After applying the desired coverage pattern to the speaker array, processing proceeds to 380.

At 380, sound is reproduced via the speakers according to the desired coverage pattern. This may include operating the speakers in the speaker array with the phase and amplitude profiles selected in 370, above. This may result in each speaker in the speaker array having a unique phase and amplitude profile; however, in some examples, two or more speakers in the array may have identical profiles. Operating the speakers in the speaker array according the profiles selected above produces sound with the desired coverage pattern. Routine 300 then returns.

Routine 300 may be carried out before sound reproduction begins, e.g., at the beginning of a performance. Additionally or alternatively, routine 300 may be carried out periodically during sound reproduction, or continually. In this manner, routine 300 may allow the DASS to update the coverage pattern periodically or in real time, as audience distribution changes throughout a performance, for example. Thus, if audience members enter the venue during sound reproduction, routine 300 may automatically adjust the coverage area to send an appropriate SPL to the new audience members in real time and without operator inputs. Conversely, if audience members exit the venue during sound reproduction, routine 300 may automatically adjust the coverage pattern such that a lower SPL is being sent to the area previously occupied by those audience members. This may also be performed in real time without operator inputs. In this way, an optimal listening experience may be ensured for all audience members, since sound will not be sent to regions of the venue where it is not needed. This may reduce power consumption of the DASS system, as well as reducing undesirable reverberation effects which may be caused by delivering sound to regions of the venue with no audience members.

Figure 4A:
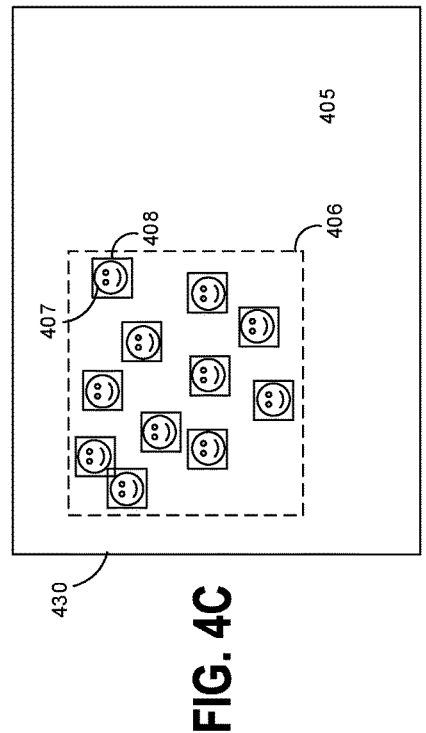
FIGS. 4A-D show an example of facial detection and selecting a coverage pattern based thereon with a single cluster.

Turning now to FIGS. 4A-D, an example is depicted of selecting a coverage pattern based on the facial detection results. The method depicted in FIGS. 4A-D may be performed by routine 300 in step 360, for example. FIG. 4A shows as example image 410 of a venue 405 which may be captured by camera 113 at 320. Image 410 may include one or more faces 407 of audience members populating the venue 405. Image 410 may be subjected to facial detection at 330, for example. In this example, the image is taken from a camera which is mounted near or in the speaker array, thus the perspective of the camera and the speaker array may be substantially the same. However, the camera may be mounted in a different location. Further, in this example, the horizontal direction is assumed to be the direction along which the coverage pattern of the speaker array may vary, although in other examples the speaker array may vary its coverage pattern along a vertical direction, or other direction. Further, while this example depicts varying the coverage pattern along a single axis, further embodiments are contemplated in which the coverage pattern may be varied along two or more axes.

Figure 4C:
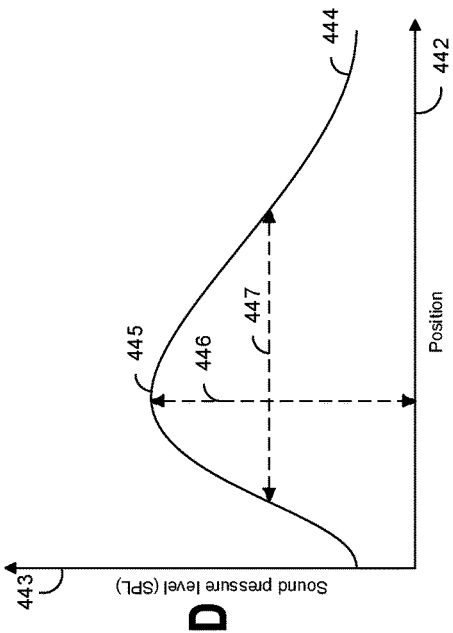
Figure 4B:
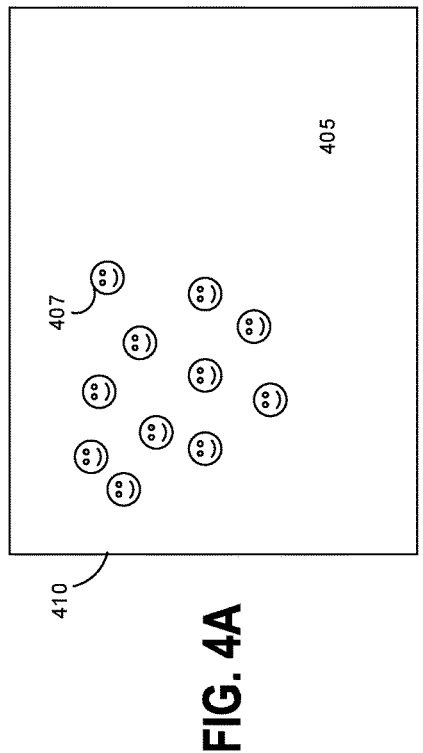

FIG. 4B shows an example result image 420 which results from the facial detection. Individual faces 407 may be indicated by the facial detection algorithm. In this example, faces 407 are indicated by boxes 408 bounding the faces, however it is not necessary that the faces be identified visually as shown in FIG. 4B. For example, the facial detection algorithm could return an annotated image, as shown in FIG. 4B, or a list of pairs of locations, identified by for example x and y pixel values, where each pair of locations defines the boundary of a face. Alternatively, the facial detection algorithm could include identifying only the center of each face, or another appropriate point. Once the facial detection data is obtained, the DASS may identify a cluster of faces in the result image.

FIG. 4C shows the result of identifying a cluster in the facial detection image. In this case, the method may only identify a single cluster 406. In FIG. 4C, all faces present in the venue are included in cluster 406, but in another example, one or more faces may not be included in the cluster 406. The size and location of the cluster may be determined based on the locations of the individual faces, provided by the facial detection algorithm. For example, in this case, the bounds of the cluster 406 may be obtained by searching for extreme high and low values of the X and Y positions of each face in the cluster, where the boundaries of the cluster are then assumed to be equal to those extreme values. Alternatively, the boundaries of the cluster may be set outside the extreme values by a predetermined amount. In other examples, the location of the cluster 406, or of more than one cluster, may be determined using other appropriate methods, such as cluster analysis, described in more detail below.

Figure 4D:
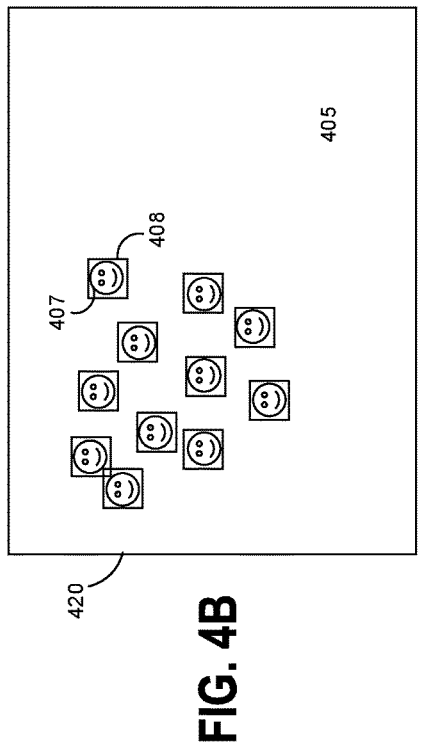

FIG. 4D shows an example of a coverage pattern based on the facial detection and cluster identification above. FIG. 4D includes a horizontal position axis 442, sound pressure level axis 443, and coverage pattern 444. As discussed above, the coverage pattern 444 may be measured at a predetermined distance from speaker array 221, for example. In FIG. 4D, coverage pattern 444 is depicted as having a single peak 445, which is chosen to be located in the center of cluster 406. That is, the coverage pattern 444 may be chosen such that the coverage pattern 444 has the greatest SPL at the center of the cluster 406 of audience members present in the venue 405, based on the facial detection data. However, in other examples, the peak may be selected to be located at a different location inside the cluster, at an edge of the cluster, or outside the cluster. The coverage pattern may be selected to have two or more peaks, in which all peaks may be located inside the cluster, for example.

Continuing with this example, the magnitude 446 of the peak 445, that is the SPL at the peak, may be selected based on the properties of the cluster. For example, the magnitude 446 of the peak may be increased with the physical size of the cluster, the density of the cluster (number of audience members divided by the area of the cluster), or the number of audience members present in the cluster. Additionally, a width or dispersion 447 of the peak may be selected based on the properties of the cluster 406, for example, the width 447 may be increased as the width of the cluster increases or as population or density of the cluster increases. In one example, the coverage pattern may be selected to provide an SPL greater than a first threshold to all areas inside the cluster. In another example, the coverage pattern may be selected to provide an SPL less than a second threshold to all areas outside the cluster. The first and second thresholds may be the same threshold or different thresholds.

Figure 5A:
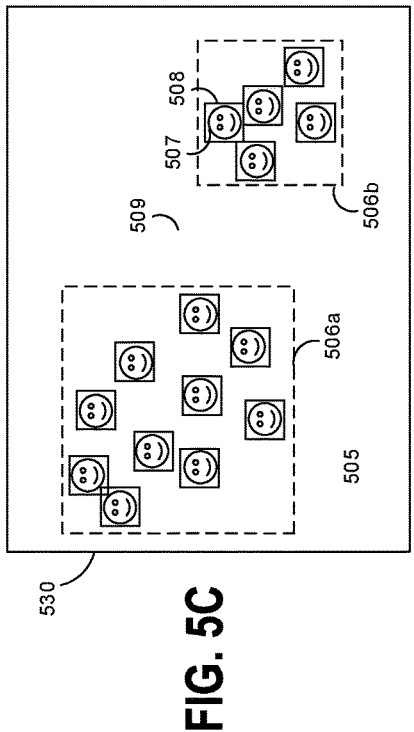
FIG. 5A-D show an example of facial detection and selecting a coverage pattern based thereon with multiple clusters.

Turning now to FIGS. 5A-D, another example is depicted of selecting a coverage pattern based on the facial detection results. The method depicted in FIGS. 5A-D may be performed by routine 300 in step 360, for example. FIG. 5A shows an example image 510 of a venue 505 which may be captured by camera 113 at 320. Image 510 may include one or more faces 507 of audience members populating the venue 505. Image 510 may be subjected to facial detection at 330, for example. In this example, the image is taken from a camera which is mounted near or in the speaker array, thus the perspective of the camera and the speaker array may be substantially the same. However, the camera may be mounted in a different location. Further, in this example, the horizontal direction is assumed to be the direction along which the coverage pattern of the speaker array may vary, although in other examples the speaker array may vary its coverage pattern along a vertical direction, or other direction. Further, while this example depicts varying the coverage pattern along a single axis, further embodiments are contemplated in which the coverage pattern may be varied along two or more axes.

Figure 5C:
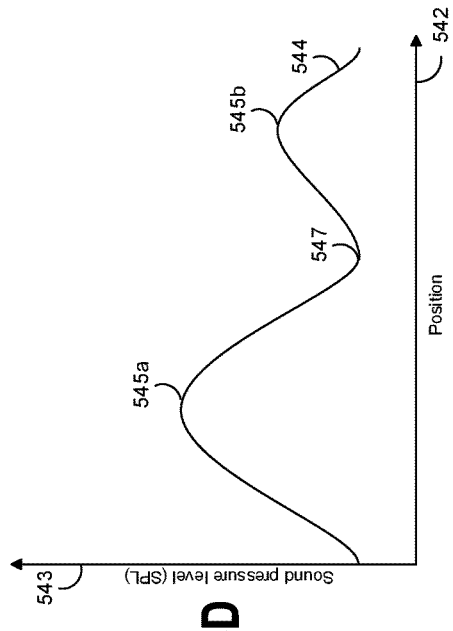
Figure 5B:
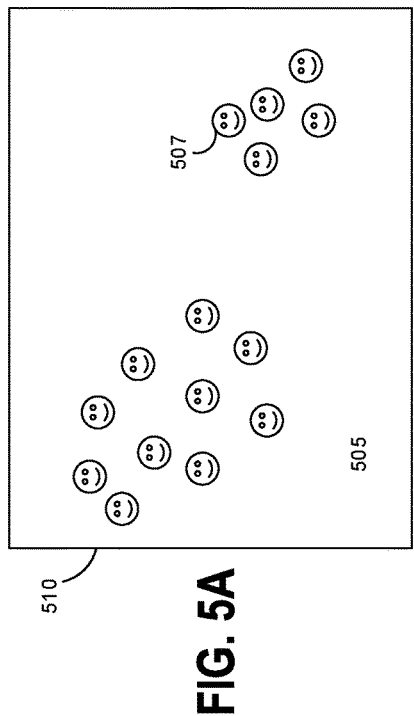

FIG. 5B shows an example result image 520 which results from the facial detection. Individual faces 507 may be indicated by the facial detection algorithm. In this example, faces 507 are indicated by boxes 508 bounding the faces, however it is not necessary that the faces be identified visually as shown in FIG. 5B. For example, the facial detection algorithm could return an annotated image, as shown in FIG. 5B, or a list of pairs locations, identified by for example X and Y pixel values, where each pair of locations defines the boundary of a face. Alternatively, the facial detection algorithm could include identifying only the center of each face, or another appropriate point. Once the facial detection data is obtained, DASS may identify one or more clusters of faces in the result image.

FIG. 5C shows the result of identifying clusters in the facial detection image. In this case, the method identifies two clusters 506a and 506b, but the method may identify more or fewer clusters. In FIG. 5C, all faces present in the venue are included in one of clusters 506a and 506b, but in another example, one or more faces may not be included in a cluster. The size and location of each cluster may be determined based on the locations of the individual faces, provided by the facial detection algorithm, by using an appropriate cluster analysis algorithm, such as those discussed below. FIG. 5C shows the result of one such clustering algorithm.

Figure 5D:
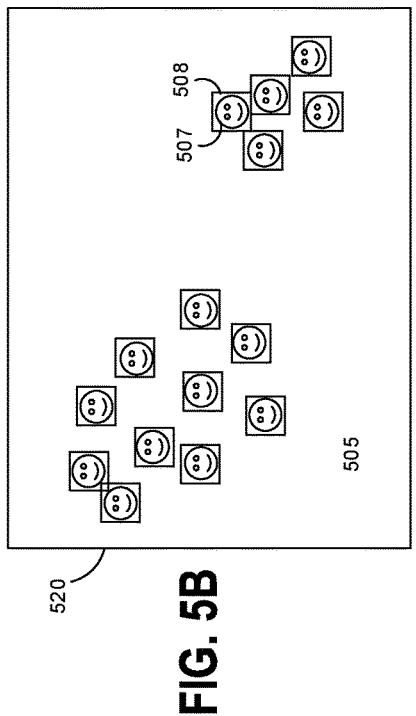

FIG. 5D shows an example of a coverage pattern based on the facial detection and cluster identification above. FIG. 5D includes a horizontal position axis 542, a sound pressure level axis 543, and the coverage pattern plot 544. As discussed above, the coverage pattern may be measured at a predetermined distance from speaker array 221, for example. In FIG. 5D, coverage pattern 544 is depicted as two peaks 545a and 545b which are chosen to be located in the center of clusters 506a and 506b, respectively. That is, the coverage pattern may be chosen such that the coverage pattern has the greatest SPL at the center of one or more clusters of audience members present in the venue, based on the facial detection data. However, in other examples, the peaks may be selected to be located at a different location inside each cluster, at an edge of each cluster, or outside each cluster. In addition, the magnitude and width or dispersion of each peak may be adjusted according to the properties of each cluster, as described above with reference to FIG. 4D.

In this example, the magnitude (SPL) of each peak is selected based on the number of audience members in each cluster. Thus, since cluster 506a has more audience members than cluster 506b, the SPL at peak 545a is shown as greater than the SPL at peak 545b. Further, the width of each peak is selected based on a physical width of each cluster in this example. Thus the width of peak 545a is wider than the width of peak 545b, since cluster 506a is wider than cluster 506b. The magnitude and width of the peaks may be further selected based on other properties of the clusters, including population, density, size, area, shape, or position. In other examples, the height and width of each peak may be substantially the same, even though the properties of their respective clusters may vary. The peak magnitude and width may be independent of cluster size, population, or density, and only the location of the peaks may vary in some example. In embodiments where the coverage pattern does not include peaks, the coverage pattern may nevertheless be selected based on one or more of the cluster properties including population, density, size, area, shape, or position.

While FIG. 5C depicts clusters 506a and 506b as substantially square or rectangular, this is not necessary. Clusters may comprise a suitable shape, such as circular, polygonal, or irregular shapes. The coverage pattern 544 may also be selected based on one or more properties of the region lying outside of clusters 506a and 506b. For example, a location of a trough 547 between peaks may be selected based on the location of a substantially empty region 509 in venue 505. The magnitude and/or width of the trough 547 may similarly be determined by a size or shape of the empty region 509. The SPL in empty regions lying outside of clusters of audience members may be selected to be less than the SPL delivered to clusters of audience members.

Figure 6:
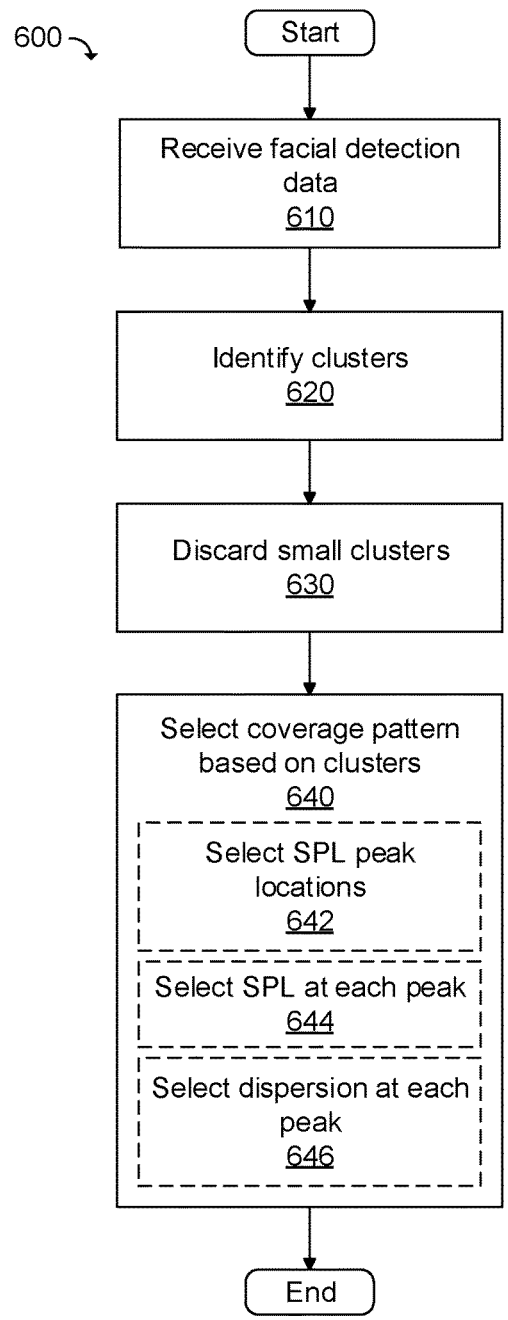
FIG. 6 shows a method for identifying clusters of audience members and selecting a coverage pattern based thereon.

Turning now to FIG. 6, an example high-level routine 600 is depicted. Routine 600 may include some or all of the steps depicted in FIGS. 4-5. Routine 600 may be performed as part of routine 300, at block 360. Routine 600 begins at step 610, where facial detection data is received. This may be the facial detection data obtained from step 330 in routine 300, such as that depicted in FIGS. 4B and 5B.

At 620, the routine includes identifying clusters in the facial detection data. This may be accomplished by an appropriate cluster identification or analysis method. For example, identifying a cluster may proceed by searching for extreme high and low values of the X and Y positions of each face in the cluster, where the boundaries of the cluster are then assumed to be equal to those extreme values. Alternatively, the boundaries of the cluster may be set outside the extreme values by a predetermined amount.

In other embodiments, the DASS may determine the clusters by a density-based algorithm or other appropriate method. For example, step 620 may include evaluating the position of each audience member in the facial detection data to determine a number of other audience members within a threshold distance. Audience members which have more than a threshold number of nearby other audience members may be designated "core" audience members. Any other (secondary) audience members which are within the threshold distance of a core audience member may be considered a part of the same cluster as the core audience member; this process may be repeated for other audience members which are within the threshold distance from the (secondary) audience members, and so forth, to determine which groups of audience members belong to which clusters. In other examples, clusters of audience members may be determined using appropriate cluster analysis methods, including hierarchical clustering, k-means clustering algorithm, expectation-maximization clustering methods, density-based clustering models such as DBSCAN, or other known clustering techniques.

Once the audience members belonging to each cluster are determined, the boundaries of each cluster may be determined. This may include selecting an appropriate shape to surround the identified audience members, such as rectangular clusters shown in FIGS. 4C and 5C. The cluster shape need not be rectangular, but may also be circular, triangular, polygonal, elliptical, or irregular shapes, including 1-, 2-, or 3-dimensional shapes, areas, or volumes. Alternatively, the area of the cluster may be defined by the periphery formed by the outermost audience members in each identified cluster. In still further examples, the DASS may include a fixed or predetermined number of clusters of a given size and/or shape. The DASS may be configured to arrange the clusters so as to maximize the number of detected audience members which are included in the clusters. Once clusters of audience members have been identified in the facial detection data, routine 600 proceeds to 630.

At 630, routine 600 optionally includes discarding small clusters. This may include discarding clusters with a number of audience members below a threshold, or discarding clusters with a physical dimension less than a threshold, such as a length, width, or area of the cluster. In another example, at step 630, the routine may include discarding clusters which have an audience member density below a threshold. Additionally or alternatively, at 630, the routine may discard clusters which are located too close to a periphery of the venue or the camera's visual field, e.g., within a threshold distance of the periphery. The routine may also discard clusters which contain audience members which are too far from the speaker array, such as greater than a threshold distance away from the speaker array. Once the selected clusters are discarded, the routine proceeds to 640.

At 640, routine 600 includes selecting a coverage pattern based on the clusters identified in the previous step. This may include selecting a coverage pattern using one or more of the methods described above with reference to FIGS. 4D and 5D. This may include selecting a location for one or more SPL peaks in the coverage pattern based on the locations of the clusters at 642, selecting a desired SPL (magnitude) at each peak location based on one or more properties of each cluster at 644, and selecting a width or dispersion of each peak based on one or more properties of each cluster at 646. This process is described in more detail above. However, in other embodiments, block 640 may not include blocks 642, 644, and 646. In some examples, the routine 600 may include at 640 increasing the SPL of the coverage pattern in locations including clusters of audience members and decreasing the SPL of the coverage pattern in locations not including clusters of audience members. The routine may include defining a desired SPL at a plurality of points and interpolating between them to generate a coverage pattern, such as by generating a piecewise linear or cubic spline interpolation. Alternatively, the routine may define the desired SPL at a plurality of points and determine a coverage pattern by regression analysis. In yet another example, the method may include locally defined functions which are stitched together at the endpoints or boundaries.

In some examples, the method may further select the desired SPL or coverage pattern based on a distance between the speaker array or camera and the detected audience members. For example, the method may include computing a distance of each face based on the detected size of each face, determined previously in the facial detection routine. The method may assign a greater distance to smaller faces and a lesser distance to larger faces, for example. The routine may in some cases compute an average distance for all faces detected, or may compute an average distances for all faces within a cluster, for each cluster. Additionally or alternatively, the method may compute a distance or average distance of detected faces based on a computed distance between nearest-neighbor faces. For example, faces may be assumed to be closer to the camera when individual faces are farther apart in the facial detection data, and faces may be assumed to be farther from the camera when individual faces are closer together in the facial detection data. This observation may also be used to compute an average distance of faces from the camera and/or speaker array.

Having computed a distance of the faces, or an average distance of all faces in the image or individual clusters, the method may include selecting the coverage pattern based on the computed distance of the faces from the camera and/or speaker array. For example, the coverage pattern may be selected to direct a higher SPL to audience members who are farther from the source, and a lower SPL to audience members who are closer to the source. In one example, this may comprise directing a first, higher SPL to a first cluster, wherein the average distance of the audience members in the first cluster is a first, higher distance, and a second, lower SPL to a second cluster, wherein the average distance of the audience members in the second cluster is a second, lower distance from the speaker array. In other examples, the coverage pattern may be selected to direct a lower SPL to faces which are farther away and a higher SPL to faces which are closer. For example, the coverage pattern may be selected such that a low or substantially zero SPL is delivered to clusters in which the average distance of the faces from the source is greater than a threshold. This may prevent the delivery of sound to regions where potential audience members are too far away to hear. In this manner, a desired coverage pattern may composed and/or selected in step 640. Routine 600 then returns.

Figure 7C:
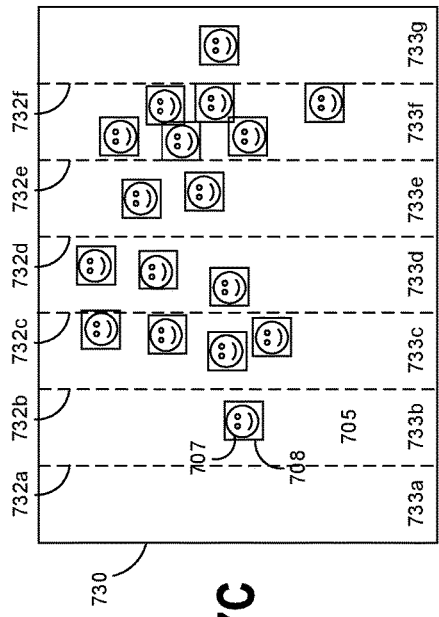
FIG. 7A-D show an example of facial detection and selecting a coverage pattern based on audience density obtained therefrom.
Figure 7D:
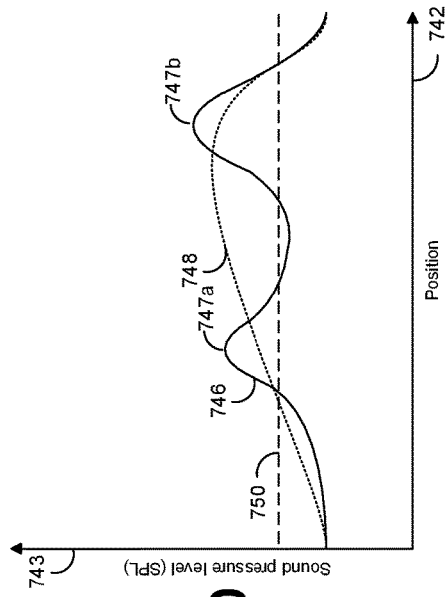
Figure 7A:
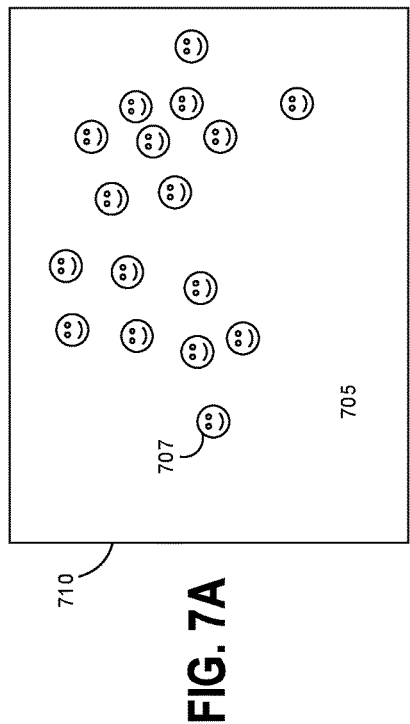

Turning now to FIGS. 7A-D, another example is depicted of selecting a coverage pattern based on the facial detection results. The method depicted in FIGS. 7A-D may be performed by routine 300 in step 360, for example. FIG. 7A shows an example image 710 of a venue 705 which may be captured by camera 113 at 320. Image 710 may include one or more faces 707 of audience members populating the venue 705. Image 710 may be subjected to facial detection at 330, for example. In this example, the image is taken from a camera which is mounted near or in the speaker array, thus the perspective of the camera and the speaker array may be substantially the same. However, the camera may be mounted in a different location. Further, in this example, the horizontal direction is assumed to be the direction along which the coverage pattern of the speaker array may vary, although in other examples the speaker array may vary its coverage pattern along a vertical direction, or other direction. Further, while this example depicts varying the coverage pattern along a single axis, further embodiments are contemplated in which the coverage pattern may be varied along two or more axes.

Figure 7B:
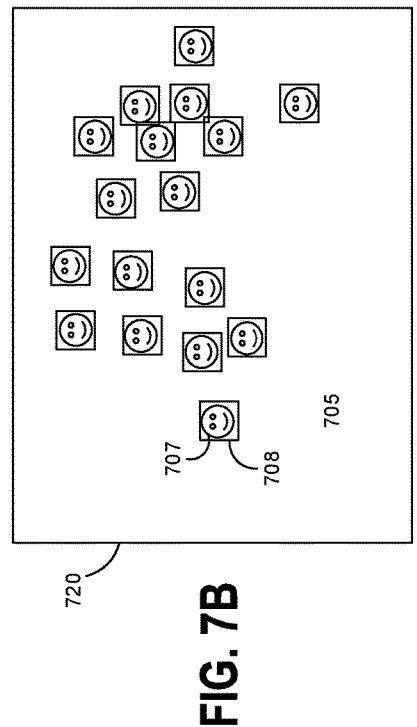

FIG. 7B shows an example result image 720 which results from the facial detection. Individual faces 707 may be indicated by the facial detection algorithm. In this example, faces 707 are indicated by boxes 708 bounding the faces, however it is not necessary that the faces be identified visually as shown in FIG. 7B. For example, the facial detection algorithm could return an annotated image, as shown in FIG. 7B, or a list of pairs locations, identified by for example X and Y pixel values, where each pair of locations defines the boundary of a face. Alternatively, the facial detection algorithm could include identifying only the center of each face, or another appropriate point. Once the facial detection data is obtained, the DASS may identify the density of audience members in the resulting data.

FIG. 7C shows the result of identifying the density of audience members in the facial detection image. In this example, the method proceeds by dividing the image of the venue 705 into regions, schematically depicted by broken lines 732a-732f which delimit the venue image into regions 733a-733g. The number and/or locations of the regions may be predetermined or, in some cases, may be dynamically determined based on the number and/or distribution of the audience members. For example, the venue may be broken up into a greater number of regions when there are more audience members detected, to provide a finer resolution for the desired coverage pattern. Further, while the depicted example shows breaking the venue into regions along one axis only, in other examples the venue may be broken into regions along multiple axes, thereby segmenting the venue into 2- or 3-dimensional regions. The size, shape, number or location of the regions may be constant, or may vary as the audience distribution changes, or according to other parameters. For example, the DASS may be configured to vary the number of regions based on available processing capacity of the processor, employing a larger number of regions when more processing power is available and a lower number of regions when less processing power is available.

The method may then count the number of audience members identified in each region. In the image depicted in FIG. 7C, for example, region 733a includes 0 audience members, while region 733f includes 6 audience members. Additionally or alternatively, the method may compute an audience density of each region by dividing the number of audience members identified in each region by the respective area of the region. This may also include a weighting factor applied to each region, or transforming the image to compensate for distortion due to the camera lens or the perspective of the venue. Once a density value for each region is obtained, a desired coverage pattern may be obtained.

FIG. 7D shows two example coverage patterns which may be obtained based on the acquired audience density data. FIG. 7D includes a horizontal distance axis 742, a sound pressure level axis 743, and two coverage pattern plots 746 and 748. A coverage pattern may be obtained by selecting a desired SPL in each region and interpolating between them using, for example, piecewise linear interpolation, or cubic or quadratic spline interpolation. In another example, generating the coverage pattern may include using regression analysis to fit a curve of a desired form to the selected SPL levels in each region. The curve may be one or more of linear, polynomial, Gaussian, exponential, power law, sinusoidal, or other appropriate curve. The SPL may be selected in each region to increase as the audience member density of the region increases and decrease as the audience member density decreases. For example, coverage pattern 748 may be selected such that the SPL is substantially proportional to the population of each region, resulting in a coverage pattern with two local maxima 747a and 747b. Regions without audience members, or with a number of audience members below a threshold, may be supplied a SPL which is low or substantially zero. In particular, regions without audience members, or with a number or density of audience members below a threshold, may be supplied a lower SPL than regions with audience members, or with a number or density of audience members above the threshold.

FIG. 7D also provides another example coverage pattern. In this example, coverage pattern 748 may be selected to provide an SPL above a threshold SPL to all regions with at least a threshold number of audience members (in this example, the threshold number of audience members is 2), and to provide an SPL below the threshold SPL to all regions with less than the threshold number of audience members. The threshold SPL is depicted schematically at 750. In this example, the coverage pattern provides SPL greater than the threshold to regions 733c-733f and provides SPL less than the threshold to regions 733a, 733b, and 733g. In some examples, the coverage pattern may be selected to provide substantially identical SPL to all regions with at least a threshold number of audience members, and substantially zero SPL to all other regions. However, in another example, the SPL may vary between regions.

Figure 8:
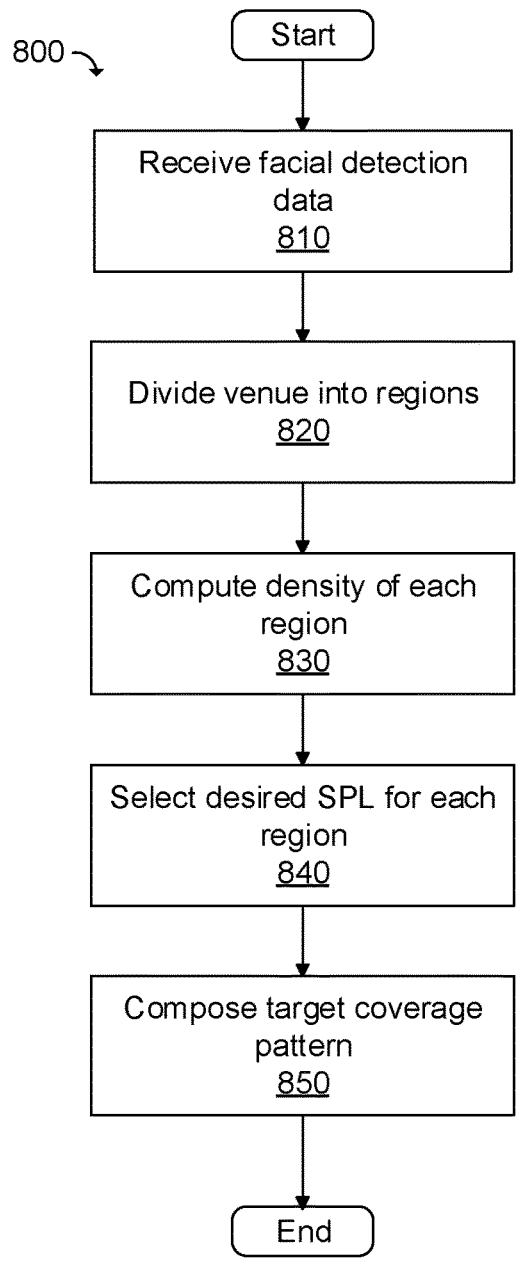
FIG. 8 shows a method for identifying audience density and selecting a coverage pattern based thereon.

Turning now to FIG. 8, an example high-level routine 800 is depicted. Routine 800 may include some or all of the steps depicted in FIG. 7. Routine 800 may be executed at block 360 in routine 300. Routine 800 begins at 810, where the routine receives facial detection data. This may be the facial detection data obtained from step 330 in routine 300, such as that depicted in FIG. 7B.

At 820, the routine includes dividing the venue into regions. This may be accomplished by means described above with reference to FIG. 7C. In some examples, the routine may include dividing the venue along multiple axes, to provide multi-dimensional density values in the following processing steps. Once regions of the venue have been identified in the facial detection data, routine 800 proceeds to 830.

At 830, routine 800 includes computing the density of each region identified in the previous step, as described above with reference to FIG. 7C. This may be accomplished by counting the audience members in each region, giving the number of audience members per region. Alternatively, the method may include dividing each number by the corresponding area of the region, thereby obtaining a number of audience members per unit area in each region. This may include applying a weighting factor or transforming the image before or after computing the density. Once a density value is obtained for each region, the method proceeds to 840.

At 840, routine 800 includes selecting a coverage pattern based on the densities identified in the previous step. This may include selecting a coverage pattern using one or more of the methods described above with reference to FIG. 7D. This may include selecting a desired SPL for each region based on the identified density in each region. This may include selecting a greater SPL in regions with greater density and a lower SPL in regions with lower density; selecting an SPL proportional to the density in each region; selecting a first, higher SPL in regions with a density above a threshold and a second, lower SPL in regions with a density below the threshold, and so forth. Once the routine has selected a desired SPL in each region, processing proceeds to 850.

At 850, a target coverage pattern is composed based on the desired SPL in each region selected at 840. The routine may include interpolating between desired SPL points to generate a coverage pattern, such as by generating a piecewise linear or cubic spline interpolation. Alternatively, the routine may determine a coverage pattern by regression analysis. In yet another example, the method may include locally defined functions which are stitched together at the endpoints or boundaries, or another of the methods discussed above to generate a coverage pattern based on the desired SPL in each region. In this manner, a desired coverage pattern may composed in step 850. Routine 800 then returns.

Thus, in some embodiments, the above disclosure provides for a method, comprising adjusting a coverage pattern of a loudspeaker array based on a distribution of audience members. This method may include the distribution of audience members being obtained from facial detection data; capturing an image of the audience members with a camera, and performing facial detection on the image to obtain the facial detection data. Adjusting the coverage pattern may include increasing a first sound intensity directed toward a first region and decreasing a second sound intensity directed toward a second region. In this method, the first region may include one or more audience members, and the second region may not include audience members; or, the first region may include a number of audience members greater than a threshold, and the second region may include a number of audience members less than a threshold.

In some examples, the first and second regions may comprise clusters of audience members, wherein the first and second sound intensities may be selected based on a number of audience members populating each of the respective first and second clusters; the first and second sound intensities may comprise peaks in the coverage pattern; a width of the peaks may be selected based on a size of the respective first and second clusters; the method may include decreasing a third sound intensity directed toward a third region, the third sound intensity being decreased to less than the first and second sound intensities, wherein the third region comprises a region outside the clusters of audience members.

In other embodiments, adjusting the coverage pattern may include adjusting a phase and an amplitude of respective loudspeakers in the loudspeaker array. Additionally or alternatively, adjusting the coverage pattern may be performed without a three-dimensional venue model or respective digital signal processing parameters. The method may also include reproducing sound via the loudspeaker array based on the adjusted coverage pattern.

The above disclosure may also provide for a system, comprising a loudspeaker array including a plurality of loudspeakers directed toward a venue, a camera directed toward the venue, and a processor including computer-readable instructions stored in non-transitory memory for: obtaining an image of the venue with the camera, processing the image to obtain facial detection data, and selecting a coverage pattern for the loudspeaker array based on the facial detection data. There may be further instructions for determining a distribution of audience members based on the facial detection data, wherein selecting the coverage pattern is further based on the distribution. The distribution may include an audience member density in each of one or more regions of the venue. The coverage pattern may be further selected based on the density of each of the one or more regions to direct greater sound intensity to regions with higher density and lower sound intensity to regions with lower density. The coverage pattern may be further selected based on the density of each of the one or more regions to direct a sound intensity greater than a sound intensity threshold to regions with density higher than a density threshold.

In another embodiment, the above disclosure may provide for a method, comprising receiving an image of a venue from a camera, performing facial detection on the image to obtain facial detection data, analyzing the facial detection data to obtain an audience member distribution, adjusting a coverage pattern of a loudspeaker array based on the audience member distribution to direct a first, greater sound level to a first region, and a second, lower sound level to a second region, and reproducing sound via the loudspeaker array. Analyzing the facial detection data may include identifying one or more clusters of audience members. The first and second regions may comprise first and second clusters of the one or more clusters. The first region may comprise a cluster of the one or more clusters, and the second region may be outside of the one or more clusters. The coverage pattern may be based on at least one property of the one or more clusters, the at least one property including a number of audience members in the cluster, a size of the cluster, a density of the cluster, a location of the cluster, or an area of the cluster.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the electronic device 100 and/or loudspeaker array 201 and processor 202 described with reference to FIGS. 1 and 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising
adjusting a coverage pattern of a loudspeaker array based on a distribution of audience members, the adjusting including increasing a first sound intensity directed toward a first region and decreasing a second sound intensity directed toward a second region, the first region including a two or three-dimensional space with a first perimeter of the space defined by a number of audience members greater than a threshold, the second region including a two or three-dimensional space with a second perimeter of the space defined by a number of audience members less than a threshold.

2. The method of claim 1, wherein the distribution of audience members is obtained from facial detection data, and wherein the coverage pattern is a spatial coverage pattern.

3. The method of claim 2, further comprising capturing an image of the audience members with a camera, and performing facial detection on the image to obtain the facial detection data.

4. The method of claim 1, wherein the first region includes one or more audience members, and wherein the second region does not include audience members.

5. The method of claim 1, wherein the first and second regions comprise clusters of audience members, wherein the first and second sound intensities are selected based on a number of audience members populating each of the respective first and second clusters, wherein the first and second sound intensities comprise peaks in the coverage pattern, wherein a width of the peaks is selected based on a size of the respective first and second clusters, and further comprising decreasing a third sound intensity directed toward a third region, the third sound intensity being decreased to less than the first and second sound intensities, wherein the third region comprises a region outside the clusters of audience members.

6. The method of claim 1, wherein adjusting the coverage pattern further includes adjusting a delay and an amplitude of respective loudspeakers in the loudspeaker array in response to a change in the distribution of audience members; wherein adjusting the delay and amplitude includes increasing a first delay of a first speaker in the array, decreasing a second delay of a second speaker in the array, decreasing a first amplitude of the first speaker, and increasing a second amplitude of the second speaker; and wherein the change in the distribution comprises an increase in a number of audience members in a first direction, the first direction extending from the first speaker toward the second speaker.

7. The method of claim 1, wherein adjusting the coverage pattern is performed without a three-dimensional venue model or respective digital signal processing parameters.

8. The method of claim 1, further comprising reproducing sound via the loudspeaker array based on the adjusted coverage pattern.

9. A system, comprising
a loudspeaker array including a plurality of loudspeakers directed toward a venue,
a camera directed toward the venue,
a processor including computer-readable instructions stored in non-transitory memory for:
obtaining an image of the venue with the camera,
processing the image to obtain facial detection data,
selecting a coverage pattern for the loudspeaker array based on the facial detection data, the coverage pattern including increasing a first sound intensity directed toward a first region and decreasing a second sound intensity directed toward a second region, the first region including a two or three-dimensional space with a first perimeter of the space defined by a number of audience members greater than a threshold, the second region including a two or three-dimensional space with a second perimeter of the space defined by a number of audience members less than a threshold.

10. The system of claim 9, wherein the processor includes further instructions for determining a distribution of audience members based on the facial detection data, and wherein selecting the coverage pattern is further based on the distribution.

11. The system of claim 10, wherein the distribution includes an audience member density in each of one or more regions of the venue.

12. The system of claim 11, wherein the coverage pattern is further selected based on the density of each of the one or more regions to direct greater sound intensity to regions with higher density and lower sound intensity to regions with lower density.

13. The system of claim 11, wherein the coverage pattern is further selected based on the density of each of the one or more regions to direct a sound intensity greater than a sound intensity threshold to regions with density higher than a density threshold.

14. A method, comprising
receiving an image of a venue from a camera,
performing facial detection on the image to obtain facial detection data,
analyzing the facial detection data to obtain an audience member distribution,
adjusting a coverage pattern of a loudspeaker array based on the audience member distribution to direct a first, greater sound level to a first region, and a second, lower sound level to a second region, and
reproducing sound via the loudspeaker array with the adjusted coverage pattern, the first region including a two or three-dimensional space with a first perimeter of the space defined by a number of audience members greater than a threshold, the second region including a two or three-dimensional space with a second perimeter of the space defined by a number of audience members less than a threshold.

15. The method of claim 14, wherein analyzing the facial detection data includes identifying one or more clusters of audience members.

16. The method of claim 15, wherein the first and second regions comprise first and second clusters of the one or more clusters, and wherein the first and second sound levels are based on average distances of audience members in the first and second regions, the average distances determined based on a size of faces in the facial detection data.

17. The method of claim 15, wherein the first region comprises a cluster of the one or more clusters, and the second region is outside of the one or more clusters.

18. The method of claim 15, wherein the coverage pattern is based on at least one property of the one or more clusters, the at least one property including a number of audience members in the cluster, a linear dimension of the cluster, a density of the cluster, a location of the cluster, a volume of the cluster, or an area of the cluster.

* * * * *